Jan. 17, 1939.    E. ZINDEL    2,144,135
RUDDER BRAKE
Filed Feb. 10, 1937    3 Sheets-Sheet 1
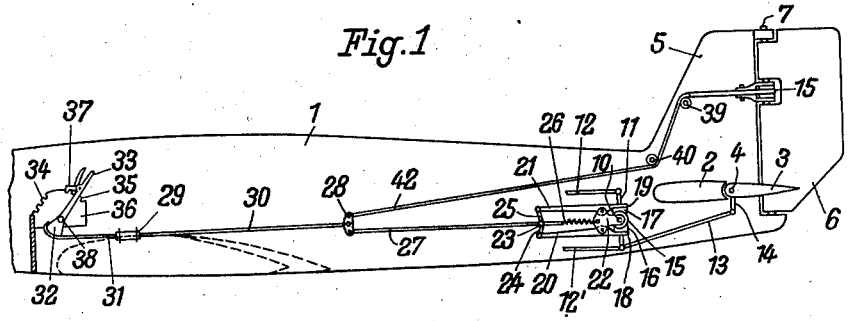
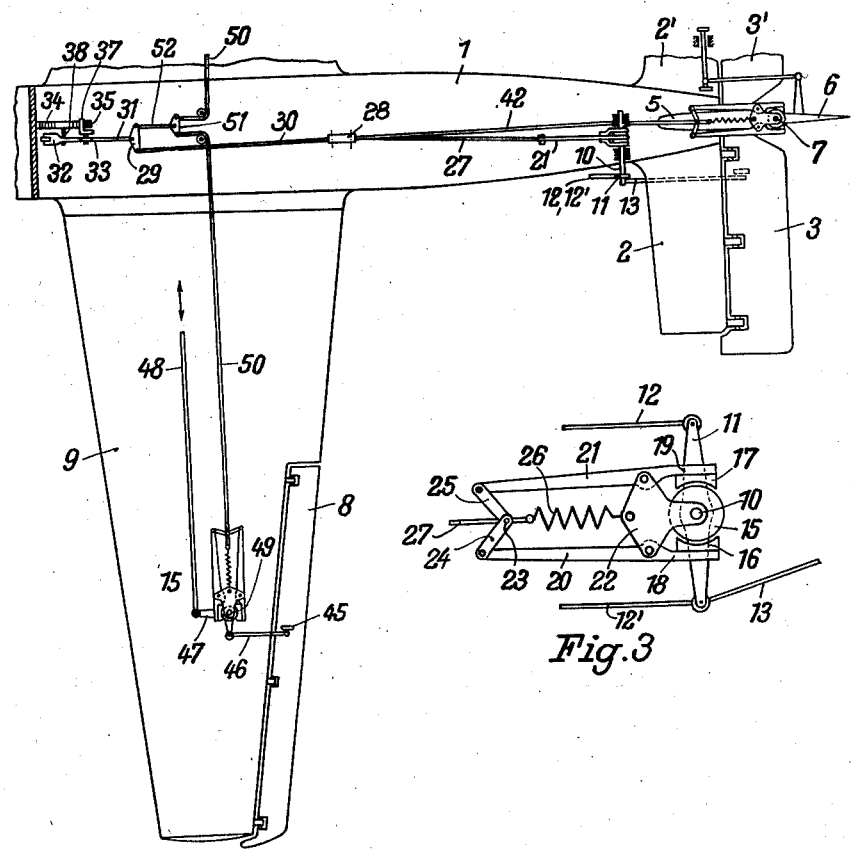
Inventor:
Ernst Zindel Jan. 17, 1939.  E. ZINDEL  2,144,135
RUDDER BRAKE
Filed Feb. 10, 1937  3 Sheets-Sheet 2

Inventor:
Ernst Zindel

Jan. 17, 1939.  E. ZINDEL  2,144,135
RUDDER BRAKE
Filed Feb. 10, 1937  3 Sheets-Sheet 3
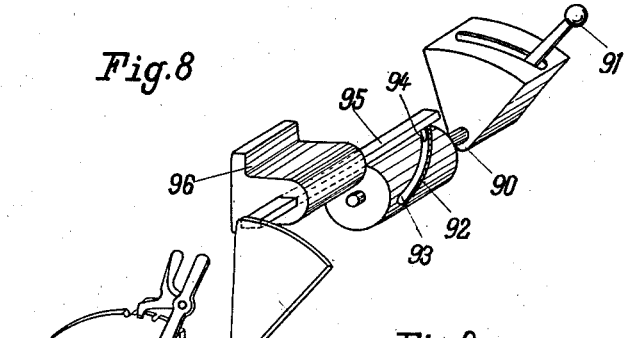
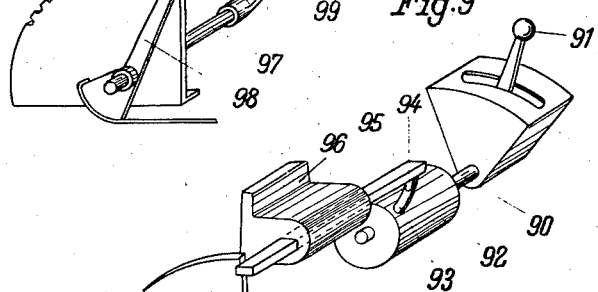
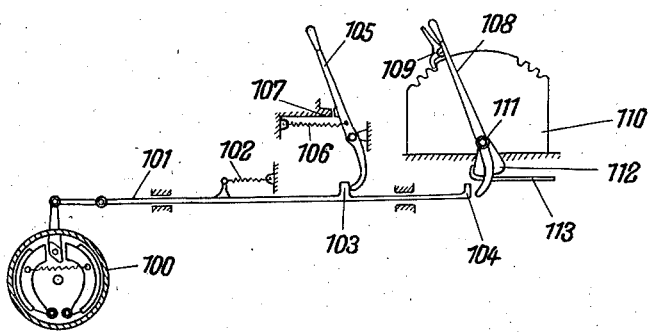
Inventor:
Ernst Zindel Patented Jan. 17, 1939

2,144,135

UNITED STATES PATENT OFFICE 2,144,135

RUDDER BRAKE

Ernst Zindel, Dessau (Anhalt) Germany, assignor to Junkers Flugzeug- und Motorenwerke Aktiengesellschaft, Dessau (Anhalt), Germany Application February 10, 1937, Serial No. 125,007
In Germany February 29, 1936

4 Claims. (Cl. 244—75)

My invention relates to aircraft and more especially to means for locking the rudders and other steering surfaces of aircraft and more especially flying machines when parking.

It is an object of my invention to provide means for locking these parts against movement under the influence of the wind.

In order to prevent the rudders, elevators, ailerons etc. in flying machines from being rocked by squalls, whereby they are liable to be injured, it has been customary to lock these rudders etc. against undesirable movement while the craft is parking. Clamps have frequently been used for this purpose, which simultaneously grip a rudder or the like and an adjoining fixed part of the craft, for instance a fin or wing, whereby the rudder is locked against movement. However in order to thus immobilize all the rudders etc. of a flying machine, a great number of such clamps is required. In view of their considerable weight these clamps, while being suitable for use in airports are not fit to be carried along by the craft.

One has also fixed the rudders against movement by locking the adjusting gear, such as the hand and pedal levers associated with them, however this mode of fixation involves the drawback that in consequence of the elastic change of form of the power transmission members and of the play in the links and bearings of these members the rudders, although their adjusting gear is locked, are still able to oscillate slightly, i. e. to flutter. These fluttering movements of the rudders may be the cause of an excessive wear of the links and bearings, whereby exact steering might be rendered impossible. Moreover, when the rudders are acted upon by a heavy squall, inadmissible stresses on the steering gear, which is dimensioned only for normal power transmission, may arise.

In order to damp the fluttering of rudders during flight, brakes creating friction have already been combined with the rudder, these brakes being as a rule applied to the rudder by a spring and being released only temporarily when adjusting the rudder. To this end such a brake is connected with part of the steering or adjusting gear in such manner that on this part being adjusted, the brake is first cut out and the rudder turned only when the corresponding part of the adjusting gear is adjusted. However, this arrangement involves the drawback that the controlling gear has back play, whereby the exactness of steering and the safety of working of the craft is reduced. A further drawback consists therein that whenever the rudder shall be adjusted, the force of the spring acting on the brake must be overcome, whereby the operation of the rudder is impaired.

The present invention deals with the problem of providing means for fixing the movable surfaces and more especially the rudders, of aircraft, elevators and ailerons while avoiding the drawbacks adhering to the arrangements hitherto used. Such fixing means must be mounted in the craft and must be so arranged as to act directly onto the rudders etc. or onto parts adjoining same, which are connected with the rudders etc. practically without yielding and that it can be cut in and out from the pilot's seat. According to this invention this problem is solved by attaching to the movable surface to be fixed or to some part connected with it practically unyieldingly a locking device which, when it is applied, fixes the surface in position, this locking device being connected with a control member near the pilot's seat by a suitable power transmission.

In the drawings affixed to this specification and forming part thereof brake systems embodying my invention are illustrated diagrammatically by way of example.

In the drawings,

Fig. 1 illustrates the contour of an airplane fuselage with the tail unit and the means for fixing the movable surfaces in position.

Fig. 2 is a partial plan view, and

Fig. 3 illustrates the locking device proper on a larger scale.

Fig. 5 illustrates another form of a hydraulically operated locking device, while

Figs. 8 and 9 are perspective views of the blocking of the locking device control member with another control member, which prevents the craft from starting as long as the locking device is applied.

Fig. 10 is a diagrammatic showing of means for simultaneously operating the rudder brakes and the wheel brakes of the landing gear.

Figure 4:
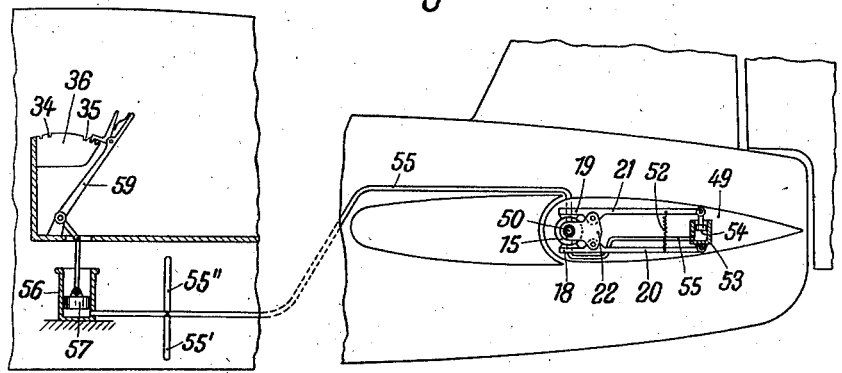
Fig. 4 is an elevation showing an arrangement for fixing an elevator in position by means of a hydraulically operated locking device, mounted inside of the elevator.

Referring to the drawings and first to Figs. 1 and 2, the tail unit comprises as usual fixed stabilizers 2, 2' and elevators 3, 3' oscillatable about an axis 4, and a fixed vertical fin 5 with a rudder 6 oscillatable about an axis 7. Ailerons 8 are hinged in a known manner to the rear edge of the wings 9. Near the elevator axis 4 is mounted in the fuselage 1 an axle 10, to which is connected the control gear adjustable from the pilot's seat, which is here represented by way of example by two ropes 12, 12', which act on a double-armed lever 11 fixed on the axle 10 and connected by means of a rigid coupling rod 13 with a lever 14 mounted on the elevator 3. On the axle 10 is mounted a brake disc 15, and 16, 17 are the brake jaws coacting with it, which are mounted on the shorter arms 18 and 19 of two levers pivotally mounted on a connecting piece 22 and the longer arms 20, 21 of which are controlled by the links 24, 25 connected at 23 (Fig. 3). Between the point 23 and the connecting piece 22 is inserted a spring 26 which tends to release the brake 9. On the point 23 further acts the rope 27 cooperating in the control of the elevator brake, this rope being connected to a power-equalizing member 28.

In Fig. 1 the brake is applied, in Fig. 3 released.

A brake comprising the same parts 15 to 26 is associated with the rudder 6, the brake discs 15 being here mounted directly on the axle 7 of the rudder 6. 42 is a rope serving for controlling this brake; it passes over sheaves 39, 40 and is connected, similarly as the rope 27 of the elevator brake, to the member 28.

As shown in Fig. 2, the ailerons 8 carry rigid levers 45 connected to coupling rods 46 which lead to angle levers 47 mounted on the wing 9 and being controlled from the pilot's seat by a system of rods 48. On the axle 49 of the angle lever 47 is mounted the disc 15 of the aileron brake, which can be applied by means of the rope 50. The ropes 50 of the two aileron brakes are connected to an equalizer 51, which is connected in its turn by a rope 52 with the equalizer 29, on which is also fixed the rope 30 from the equalizer 28. The equalizers 28, 29 and 51 resembling balance beams serve for distributing the brake applying power over the brakes.

The brake control member is formed according to Figs. 1 and 2 by a double-armed lever 32, 33 oscillatable about an axle 38 near the pilot's seat. The shorter sector shaped arm 32 of this lever is connected by a rope 31 with the equalizer or power distributing member 29, while its longer arm 33 carries a pawl 37 coacting with the notches 34, 35 of a toothed segment 36, whereby the lever 32, 33 can be fixed in different positions.

Thus, whenever the brake control member 32, 33 is carried into the position shown in Fig. 1, in which the pawl 37 extends into one of the notches 35, all the brakes are applied. By shifting the member 32, 33 into the position, in which the pawl 37 enters the notches 34, the brakes are released.

In the modification illustrated in Fig. 4 a brake operated by hydraulic or pneumatic means is mounted in an elevator 49 formed as a hollow body. Similar members are marked with similar numerals as before. The brake is designed substantially as shown in Fig. 3, however the links 24, 25 are replaced by hydraulic spreading means consisting of a cylinder 53 and piston 54, which are mounted between the longer arms 20, 21 of the brake levers. There is further mounted between these two arms a spring 52 tending to release the brake. When it is intended to apply the brake, pressure is generated in the cylinder 53, which is connected by a pipe 52 with another cylinder 56 mounted on the craft, in which a piston 57 can be reciprocated. The two cylinders and the pipe are filled with a liquid or gaseous pressure transmitting means. The piston 57 can be displaced by means of a control member 59 near the pilot's seat. When the piston 57 is forced into the cylinder 56, the brake will be applied; when the piston is shifted in the opposite sense, the brake is released. The pipe 55 extends partly through the hollow axle 50 of the elevator 49, so that on the elevator being deflected, the pipe is distorted, so that it is necessary that it be capable of yielding to such distortion. From the pipe 55 branch pipes 55' and 55'' may lead to the spreading devices of other brakes to be operated by the control member 59.

Figure 5:
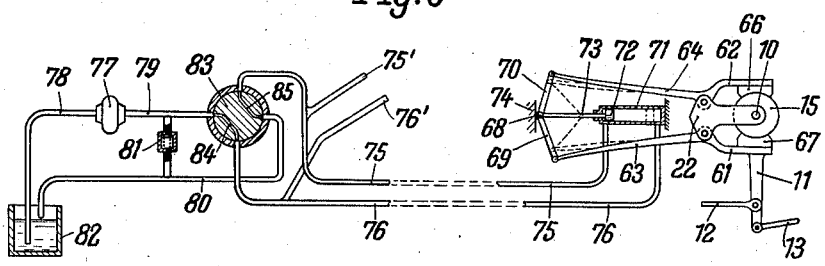

In the device illustrated in Fig. 5 the power for applying the brake is furnished by an auxiliary source of power and is controlled by means of the control member near the pilot's seat. When the brake is applied, this control member is relieved of the power serving to fix the brake in position, and this power then arises only within the members forming the brake device proper. In order that the brake be released, the auxiliary power is so controlled by the control member as to act in the opposite direction. The brake device is again equipped with two double-armed levers linked to a connecting piece 22, to the shorter arms 61, 62 of which are connected the brake jaws 66, 67 gripping the brake disc 15 on the axle 10, while to the longer elastic arms 63, 64 are connected the links 69, 70, which meet in the point 68. In the direction of the middle line of the brake device extends a cylinder 71 with piston 72 which is connected by means of a piston rod 73 to the point 68. To each end of the cylinder is connected a pipe 75 and 76, respectively, these pipes leading to a four-way cock, controllable from the pilot's seat, by means of which the pipes 75 and 76 can be connected alternately to a source of pressure medium and to an exhaust pipe or may also be shut off altogether. The source of pressure medium may for instance be formed by a pump 77 which acts by suction through pipe 78 on a reservoir 81 and forces the medium sucked in into the pressure pipe 79. Between the pressure pipe 79 and the exhaust pipe 80 is inserted a safety valve 81.

Figure 6:
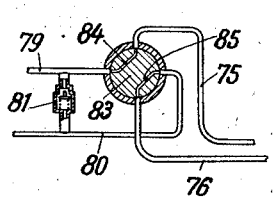
Figs. 6 and 7 illustrate a detail of the braking system of Fig. 5 on a larger scale.
Figure 7:
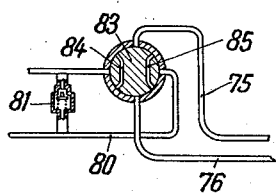

This device operates as follows: when the brake is intended to be applied, the body 83 of the four-way cock is turned into the position shown in Fig. 5, whereby the pressure medium conveyed by pump 77, flowing through boring 84 and pipe 76 into the part of the cylinder 71 extending on the right of piston 72, causes this piston to be shifted towards the left until the piston rod 73 meets an abutment 74. This causes the links 69, 70 to oscillate from their initial position (shown in dotted lines) in which the brake is released, into the position shown in Fig. 5, in which they remain, under the action of the abutments 74 and the elastic force of the lever arms 63, 64, keeping these arms spread asunder. The spreading force of the arms 63 and 64 is transmitted onto the brake jaws 66, 67, and the brake remains applied as long as this spreading force exists. After the brake has thus been applied, the body 83 of the cock can be shifted into the shut-off position shown in Fig. 7. If it is intended to release the brake, the body 83 is turned into the position shown in Fig. 6, where the pipe 75 is connected to the pressure pipe 79, pipe 76 to the exhaust pipe 80. The pressure medium now enters the part of the cylinder 71 extending on the left of piston 72 and shifts the piston towards the right. Thereby the links 69 and 70 are returned into the position shown in dotted lines in Fig. 5, in which the brake is released.

This design of the rudder brake device involves the advantage that the breaking power need not be transmitted constantly over long transmission systems, but remains accumulated in the brake members also after the auxiliary force, which applies the brake, has been cut out. More especially when operating the brake by pneumatic or hydraulic means, the braking power cannot be influenced by pressure losses arising in consequence of leakages. If a plurality of brakes of the kind illustrated in Fig. 5 shall be operated by means of the four-way cock arranged near the pilot's seat, the additional brakes will be connected to the pipes 75 and 76 by branch pipes 75' and 76', respectively.

In order that on starting the craft the pilot cannot omit to release the brakes fixing the rudders etc. in position, it is advisable to mutually block the brake control member and some other member to be adjusted on starting in such manner that this latter member can be shifted into the position corresponding to flight only after the rudder brakes have been released.

Thus for instance the control member for the rudder brakes can be blocked in the manner shown in Figs. 8 and 9 with the fuel supply control member. On the spindle 90 of the member 91 controlling the fuel supply is mounted a cylinder 92 formed with a circumferential notch 93 of helical form, into which extends a pin 94 fixed to a rod 95 extending in parallel to the cylinder axis and supported in a bearing 96 fixed to the craft against rotation, however being free to be displaced longitudinally. Such longitudinal shifting of the rod 95 occurs whenever the cylinder 92 is rotated by the operation of the fuel supply control member 91, when the pin 94 will glide in the notch 93. On the spindle 97 of the brake control member 98 is fixed a segment 99, which is so formed that it extends into the way of the rod 95, when the fuel supply control member is in the "running light" position and the brake control member in the position for applying the brakes (Fig. 8), while the segment 99 allows the rod 95 to be shifted only after the brake control member has been adjusted into the position corresponding to the release of the brakes (Fig. 9). I thereby obtain that the fuel supply control member can be shifted from its light running position only after the brake control member has been adjusted to release the brakes. If in this position of the brake control member the fuel supply control member is shifted from its running light position, the rod 95 is so displaced that its free end will extend into the way of segment 99 (Fig. 9). Thus an adjusting of the segment 99 and of the brake control member will remain impossible as long as the fuel supply control member is not in the light running position.

It is further advantageous to make provision therefor that when the craft is parked, the pilot cannot omit to apply the brakes. I obtain this by so connecting the brakes with a control member to be adjusted when parking the craft that the brakes are applied by positive action of this control member, when it is adjusted into the parking position. Thus for instance the rudder brakes may be connected with the brake acting on the landing gear wheels in the manner shown in Fig. 10. The landing gear brake can be operated by two different members, one serving for braking as long as the craft moves on the ground, while the other serves for braking the craft while at rest. To the wheel brake 100 is connected a rod 101 capable of being shifted longitudinally, on which acts permanently a spring 102 tending to release the brake. The rod is formed with two stops 103, 104, stop 103 coacting with the brake lever 105, which, while the brake is released, is permanently pulled by a weak spring 106 against a fixed check 107, while, when it is rocked by the pilot, it will apply itself against the stop 103 and will apply the brake. With the other stop 104 coacts a brake lever 108 which can be fixed in different positions by means of a pawl 109 and toothed segment 110, and which, when the brake is released, takes up the position shown in Fig. 10, wherein the pawl 109 rests in one of the notches on the left hand part of the toothed segment, while, when it is shifted by the pilot, it will apply itself against the stop 104. On the axle 111 of the brake lever 108 is further mounted a lever 112 formed as a segment, to which is connected the power transmitting member 113 leading to the rudder brakes. When the brake lever 105 is turned clockwise, the brake is applied without the parts 108—113 being influenced thereby. Any turning of the lever 108 in clockwise direction causes the wheel brake and, since the segment 112 is turned also, the rudder brakes to be applied simultaneously. By entering the pawl 109 in a notch on the right hand side of the segment 110, the wheels and rudders are thus permanently braked, when the craft is at rest.

In the claims the term "rudder" is intended to include also the elevators, ailerons and other steering surfaces.

I wish it to be understood that I do not desire to be limited to the exact details of construction shown and described for obvious modifications will occur to a person skilled in the art.

I claim:—

1. Means for immobilizing aircraft rudders during parking, comprising in combination, a rudder locking device, a control member near the pilot's seat, power transmitting means operatively connecting said control member with said locking device, an organ required to be actuated when starting the craft and means for interlocking said control member and said organ in such manner that said organ can be actuated only after the locking device has been released.

2. Means for immobilizing aircraft rudders during parking, comprising in combination, a rudder locking device, a control member near the pilot's seat, power transmitting means operatively connecting said control member with said locking device, a fuel supply controlling means required to be actuated when starting the craft and means for interlocking said control member and said fuel supply controlling means in such manner that said fuel supply controlling means can be actuated only after the locking device has been released.

3. Means for immobilizing aircraft rudders during parking, comprising in combination, a rudder locking device, a control member near the pilot's seat, power transmitting means operatively connecting said control member with said locking device, an organ required to be actuated for parking the craft and a connection between said organ and said locking device whereby said locking device is applied when said organ is so actuated.

4. Means for immobilizing aircraft rudders during parking, comprising in combination, a rudder locking device, a control member near the pilot's seat, power transmitting means operatively connecting said control member with said locking device, a landing gear, a landing gear locking device and a connection between said locking devices whereby on actuation of said control member both said locking devices will be applied and released, respectively.

ERNST ZINDEL.